(12) United States Patent
Yanagawa

(10) Patent No.: US 7,895,388 B2
(45) Date of Patent: Feb. 22, 2011

(54) BUS CONTROL DEVICE

(75) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/466,260

(22) Filed: May 14, 2009

(65) Prior Publication Data
US 2009/0313408 A1    Dec. 17, 2009

(30) Foreign Application Priority Data
Jun. 13, 2008    (JP) .............................. 2008-155359

(51) Int. Cl.
G06F 13/42    (2006.01)
(52) U.S. Cl. ..................................... 710/316
(58) Field of Classification Search ......... 710/305–317, 710/104–110
See application file for complete search history.

(56) References Cited

U.S. PATENT DOCUMENTS
7,334,120 B2 *    2/2008    Rothman et al. ............... 713/2

FOREIGN PATENT DOCUMENTS
JP    2003-006143 A    1/2003

\* cited by examiner

*Primary Examiner*—Raymond N Phan
(74) *Attorney, Agent, or Firm*—Canon U.S.A., Inc. I.P. Division

(57) ABSTRACT

A bus control device includes a multiplexer which connects a ROM controller to a common bus when a ROM mode is set and which connects a PCI controller to the common bus when a PCI mode is set. The bus control unit further includes a bus switch which disconnects a PCI bus from the common bus when the ROM mode is set and which connects the PCI bus to the common bus when the PCI mode is set.

8 Claims, 3 Drawing Sheets

FIG. 2

| MODE SETTING REGISTER | ROM MODE (DEFAULT) | PCI MODE |
|---|---|---|
| MODE SIGNAL 131 | LOW | HIGH |
| MULTIPLEXER 105 | SWITCH TO ROM BUS | SWITCH TO PCI BUS |
| BUS SWITCH 108 | DISABLE (DISCONNECT) | ENABLE (CONNECT) |
| MAIN CPU 121 | RESET STATE | RESET-CANCELLING STATE |
| PCI DEVICE A 122 | RESET STATE | RESET-CANCELLING STATE |
| PCI DEVICE B 125 | RESET STATE | RESET-CANCELLING STATE |

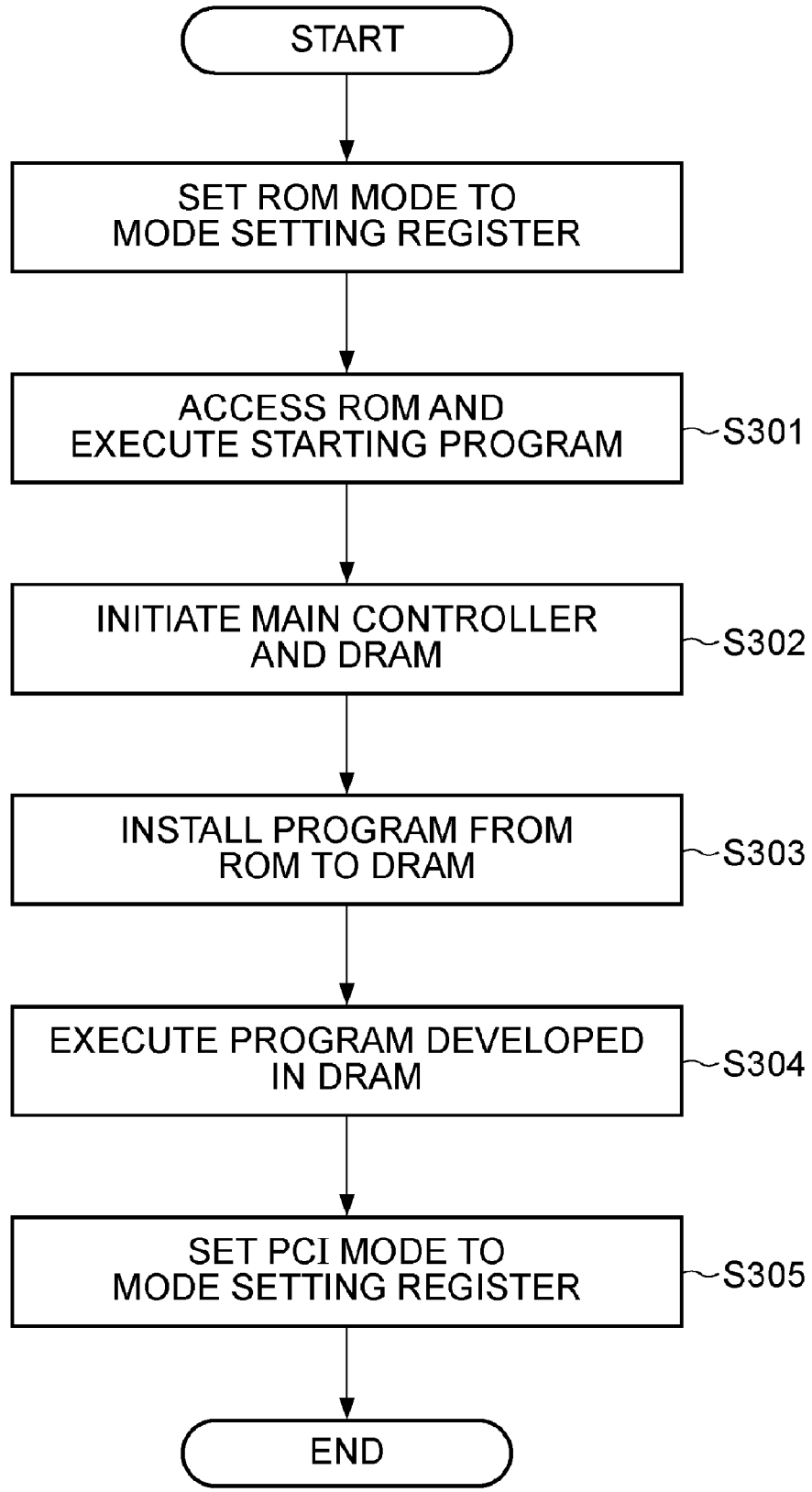

BUS CONTROL DEVICE

BACKGROUND OF THE INVENTION

1. Field of the Invention

The present invention relates to a bus control device.

2. Description of the Related Art

In general, a technique of sharing a single bus among a plurality of types of bus devices complying with different protocols is known. For example, Japanese Patent Laid-Open No. 2003-334780 discloses a system in which a bus device which complies with a PCI protocol specification and a ROM (Read-Only Memory) which does not comply with the PCI protocol specification are connected to a PCI bus serving as a common bus. The common bus is selectively connected to a ROM bus which complies with the ROM or another PCI bus through a multiplexer. Then, the multiplexer connects the ROM bus to the common bus when the ROM which is connected to the common bus is to be accessed through the ROM bus (ROM mode). On the other hand, the multiplexer connects the PCI bus to the common bus when the bus device which is complied with the PCI protocol and which is connected to the common bus through the PCI bus is to be accessed (PCI mode). Note that in the system disclosed in Japanese Patent Laid-Open No. 2003-334780, when operation is performed in the ROM mode, occurrence of access conflict in the common bus between the ROM and the PCI device is prevented by stopping supply of a clock signal to the PCI device.

However, in the system disclosed in Japanese Patent Laid-Open No. 2003-6143, arbitration for avoiding the conflict between the PCI device and the ROM which does not comply with the PCI protocol and which is connected to the PCI bus serving as the common bus is required to be performed. Therefore, the bus device connected to the PCI bus should have an arbiter capable of performing arbitration with the ROM in addition to arbitration among PCI devices. In general, since PCI bus devices have respective arbiters used to arbitrate accesses among the PCI bus devices, if extra arbiters are added to the PCI bus devices, lack of versatility occurs and cost is increased.

SUMMARY OF THE INVENTION

The present invention provides an improved bus control device.

In the bus control device having the common bus which can operate in accordance with a plurality of protocol specifications, operations in accordance with the plurality of protocol specifications are properly realized without adding an extra arbiter in the units included in the bus control device.

According to an exemplary embodiment of the present invention, there is provided a bus control device including a first bus complying with a first protocol specification, a second bus complying with a second protocol specification which is different from the first protocol specification, a third bus which operates in accordance with one of the first and second protocol specifications, a first controller configured to control the third bus in accordance with the first protocol specification, a second controller configured to control the third bus in accordance with the second protocol specification, a setting unit configured to perform a setting operation on the third bus so that the third bus operates in a first control mode controlled by the first controller or a second control mode controlled by the second controller, a connection unit configured to connect the first controller to the third bus when the setting unit sets the first control mode and configured to connect the second controller to the third bus when the setting unit sets the second control mode, and a bus switch configured to disconnect the second bus from the third bus when the setting unit sets the first control mode and configured to connect the second bus from the third bus when the setting unit sets the second control mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

FIG. 2 is a table listing operation states set using a mode setting register.

FIG. 3 is a flowchart illustrating operation performed by the bus control device.

DESCRIPTION OF THE EXEMPLARY EMBODIMENTS

Figure 1:
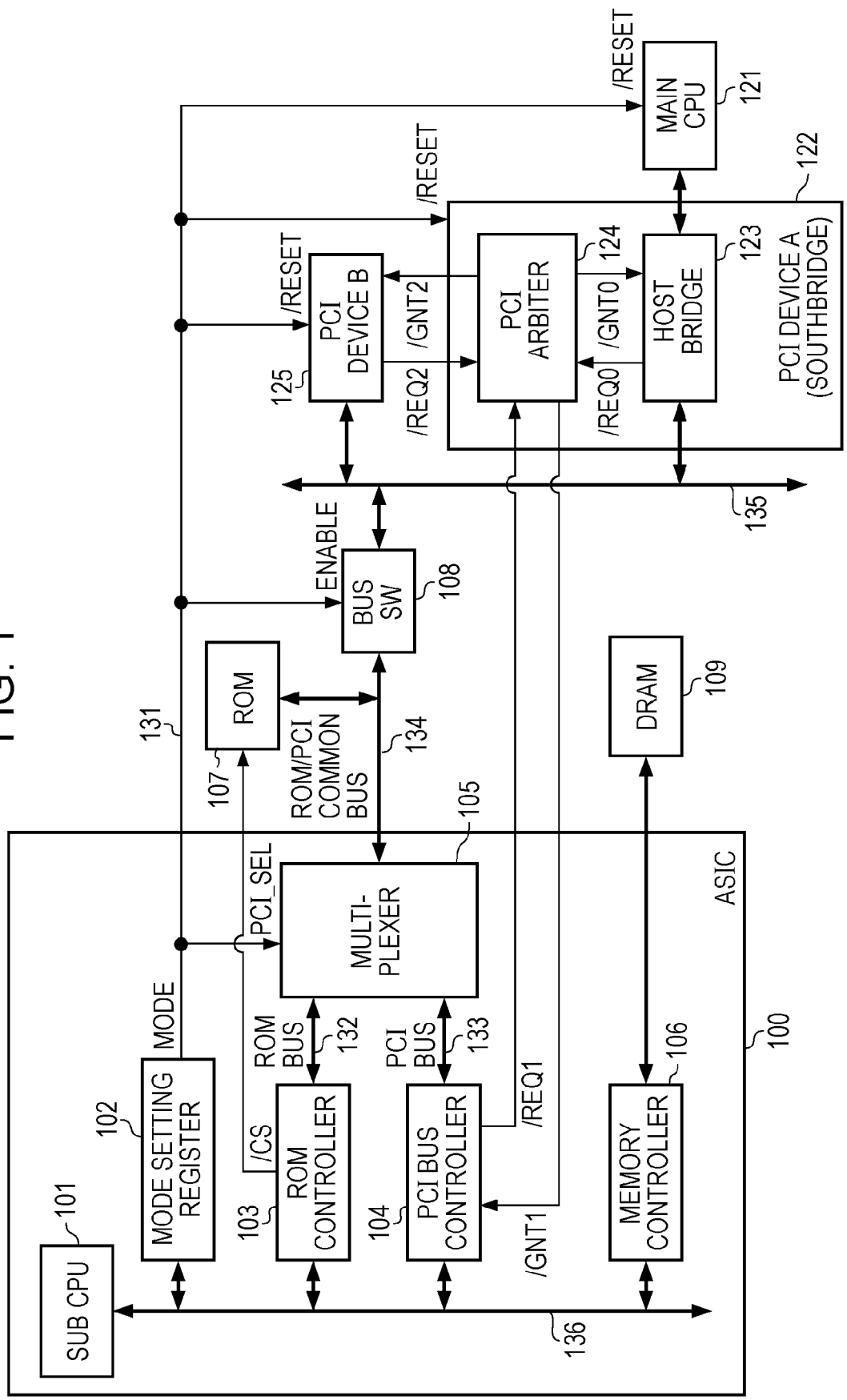
FIG. 1 is a block diagram illustrating a configuration of a bus control device according to a first exemplary embodiment.

The present invention will now be described in detail with reference to the drawings showing an exemplary embodiment thereof. In the drawings, elements and parts which are identical throughout the views are designated by identical reference numerals, and duplicate description thereof is omitted.

FIG. 1 is a block diagram illustrating a configuration of a bus control device according to a first exemplary embodiment.

In FIG. 1, a sub-CPU 101 functions as a calculation unit which executes a program, and is connected to a CPU bus 136. A mode setting register 102 sets an operation mode of the bus control device to be a ROM mode or a PCI mode. A ROM controller 103 controls a ROM 107 which is a nonvolatile memory and which is connected to a common bus 134. A PCI bus controller 104 is used to communicate with a PCI device connected to a PCI bus 135, which will be described hereinafter, through the common bus 134. A multiplexer 105 is connected to the ROM controller 103 through a ROM bus 132, and is connected to the PCI bus controller 104 through a PCI bus 133. The multiplexer 105 connects the ROM bus 132 to the common bus 134 when the ROM mode is set by the mode setting register 102. On the other hand, the multiplexer 105 connects the PCI bus 133 to the common bus 134 when the PCI mode is set by the mode setting register 102. A memory controller 106 is used to connect a DRAM 109 to the CPU bus 136. Note that the sub-CPU 101, the mode setting register 102, the ROM controller 103, the PCI bus controller 104, and the memory controller 106 are connected to the CPU bus 136. The ROM bus 132 complies with a protocol specification which is different from a protocol specification, which will be described hereinafter, of the PCI bus 133. The CPU bus 136 complies with a protocol specification which is different from the protocol specifications of the ROM bus 132 and the PCI bus 133. The sub-CPU 101, the mode setting register 102, the ROM controller 103, the PCI bus controller 104, the multiplexer 105, and the memory controller 106 are disposed on an identical integrated circuit (ASIC 100). Note that the ASIC 100 is recognized as a single PCI device when viewed from a PCI device A 122 and a PCI device B 125.

The common bus 134 complies with a PCI protocol specification or a protocol specification the same as that of the ROM bus 132 which is different from the PCI protocol specification and operates in a mode set by the mode setting register 102. At least part of an address signal line, a data signal line, and a control signal line which are included in the common bus 134 is commonly used in the operation in the ROM mode or the PCI mode.

The ROM 107 (nonvolatile memory) stores a program which is used to activate the bus control device and which is to be executed by the sub-CPU 101 when the bus control device is turned on. A bus switch 108 is used to switch two states from one to another, the two states including a state in which the common bus 134 is connected to the PCI bus 135 and a state in which the common bus 134 is disconnected from the PCI bus 135. A main CPU 121 functions as a calculation unit which executes a program. The PCI device A 122 and the PCI device B 125 are connected to the PCI bus 135. The PCI bus 135 complies with a PCI protocol specification. Note that the PCI device A 122 is connected to a host bridge 123 used to be connected to the main CPU 121 and the PCI bus 135. The PCI device A 122 includes a PCI arbiter 124 serving as an arbitration unit which arbitrates conflict among PCI devices (devices which operate in accordance with the PCI protocol specification).

A mode-setting signal line 131 notifies the multiplexer 105, the bus switch 108, the PCI device A 122, the PCI device B 125, and the main CPU 121 of a mode set by the mode setting register 102.

Referring to FIG. 2, operation states set to these units by notifying the units of the mode set using the mode setting register 102 from the mode setting register 102 through the mode-setting signal line 131 will be described. FIG. 2 is a table listing operation states set using the mode setting register 102.

First, a case where the mode setting register 102 sets the ROM mode will be described. The mode setting register 102 is activated in the ROM mode. In the ROM mode, the multiplexer 105 connects the common bus 134 to the ROM bus 132. The bus switch 108 is brought to a disable (disconnection) state, that is, the common bus 134 is disconnected from the PCI bus 135. Note that operations of the main CPU 121, the PCI device A 122, and the PCI device B 125 are reset.

Next a case where the mode setting register 102 sets the PCI mode will be described. In the PCI mode, the multiplexer 105 connects the common bus 134 to the PCI bus 133. The bus switch 108 is brought to an enable state, that is, the common bus 134 is connected to the PCI bus 135. Note that the reset states of the main CPU 121, the PCI device A 122, and the PCI device B 125 are cancelled.

Referring now to FIG. 3, operation of the bus control device will be described.

FIG. 3 is a flowchart illustrating operation performed by the bus control device, that is, operation performed by the sub-CPU 101 included in the bus control device. Note that when a power switch (not shown) of the bus control device is turned on, power is supplied to the units including the sub-CPU 101 of the bus control device whereby the operation of FIG. 3 is started.

As described above, when the bus control device performs a starting operation after the power switch thereof is turned on, a setting value corresponding to the ROM mode is set to the mode setting register 102. Therefore, when the power switch is turned on, the multiplexer 105 connects the common bus 134 to the ROM bus 132. The bus switch 108 is brought to the disable (disconnection) state, that is, the common bus 134 is disconnected from the PCI bus 135. Furthermore, the main CPU 121, the PCI device A 122, and the PCI device B 125 are reset.

In step S301, the sub-CPU 101 accesses through the ROM controller 103 and the ROM bus 132 to the ROM 107 connected to the common bus 134. Then, the sub-CPU 101 executes a starting program read from the ROM 107, whereby processing from step S302 onward is performed.

In step S302, the sub-CPU 101 accesses through the CPU bus 136 to the memory controller 106, and initializes the memory controller 106 and the DRAM 109 connected to the memory controller 106.

In step S303, the sub-CPU 101 controls the memory controller 106 so as to write (develop) the program read from the ROM 107 in the DRAM 109. Note that although the operation of writing the program read from the ROM 107 to the DRAM 109 is performed by the memory controller 106 which is appropriately controlled by the sub-CPU 101, the operation may be performed in other ways. For example, the program may be written mainly by the memory controller 106 which has a DMA transferring function and which has received an instruction of transferring of the program issued from the sub-CPU 101.

In step S304, the sub-CPU 101 executes the program developed in the DRAM 109. By executing this program, the units included in the bus control device are activated and initialized, and the bus control device is allowed to execute various operations.

In step S305, the sub-CPU 101 accesses to the mode setting register 102 through the CPU bus 136 so that the setting value of the mode setting register 102 is changed to a setting value corresponding to the PCI mode. Note that when the PCI mode is set, the multiplexer 105 connects the common bus 134 to the PCI bus 133. Furthermore, the bus switch 108 is brought to the enable (connection) state, that is, the common bus 134 is connected to the PCI bus 135. Moreover, the resetting states of the main CPU 121, the PCI device A 122, and the PCI device B 125 are cancelled.

When the reset state of the main CPU 121 is cancelled, the main CPU 121 searches for a PCI device which is connected to the PCI bus (the PCI bus 135 and the common bus 134). In this case, the main CPU 121 recognizes the ASIC 100 as a PCI device in the searching, and thereafter, the ASIC 100 is allowed to communicate with the PCI device A 122 and the PCI device B 125. Note that, in this case, the PCI arbiter 124 included in the PCI device A 122 arbitrates bus conflict among the ASIC 100, the PCI device A 122, and the PCI device B 125.

As described above, according to this exemplary embodiment, in the bus control device having the common bus which can operate in accordance with a plurality of protocol specifications, operations in accordance with the plurality of protocol specifications are properly realized without adding an extra arbiter in the units included in the bus control device.

As many apparently widely different exemplary embodiments of the present invention can be made without departing from the spirit and scope thereof, it is to be understood that the invention is not limited to the specific exemplary embodiments thereof except as defined in the appended claims.

This application claims the benefit of Japanese Patent Application No. 2008-155359 filed Jun. 13, 2008, which is hereby incorporated by reference herein in its entirety.

What is claimed is:

1. A bus control device, comprising:

a first bus complying with a first protocol specification;

a second bus complying with a second protocol specification which is different from the first protocol specification;

a third bus which operates in accordance with one of the first and second protocol specifications;

a first controller configured to control the third bus in accordance with the first protocol specification;

a second controller configured to control the third bus in accordance with the second protocol specification;

a setting unit configured to perform a setting operation on the third bus so that the third bus operates in a first control mode controlled by the first controller or a second control mode controlled by the second controller;

a connection unit configured to connect the first controller to the third bus when the setting unit sets the first control mode and configured to connect the second controller to the third bus when the setting unit sets the second control mode; and a bus switch configured to disconnect the second bus from the third bus when the setting unit sets the first control mode and configured to connect the second bus from the third bus when the setting unit sets the second control mode.

2. The bus control device according to claim 1, wherein at least part of an address signal line, a data signal line, and a control signal line which are included in the third bus is commonly used in operation in the first control mode and operation in the second control mode.

3. The bus control device according to claim 1, further comprising:

a fourth bus connected to the first control unit and the second control unit;

a first device connected to the fourth bus;

a second device connected to the second bus; and a third device connected to the third bus, wherein the first device accesses to the third device through the first control unit when the setting unit sets the first control mode, and the second device accesses to the third bus through the bus switch when the setting unit sets the second control mode.

4. The bus control device according to claim 1, wherein the setting unit sets an operation mode so that the first control mode is set for activation of the bus control device and the first control mode is switched to the second control mode in response to the activation of the bus control device.

5. The bus control device according to claim 1, wherein the first controller, the second controller, and the connection unit are disposed on an identical integrated circuit.

6. The bus control device according to claim 3, wherein the third device corresponds to a nonvolatile memory which stores a starting program used to activate the bus control device, and the first device serving as a calculation device activates the bus control device by executing the starting program read from the nonvolatile memory.

7. The bus control device according to claim 1, wherein the second device includes an arbitration unit configured to arbitrate conflict in the second bus with other devices complying with the second protocol specification.

8. The bus control device according to claim 1, wherein the second protocol specification corresponds to a PCI protocol specification.

* * * * *